United States Patent [19]

Stevenson

[11] 4,035,439

[45] July 12, 1977

[54] LOW-SHRINK THERMOSETTING POLYESTERS

[75] Inventor: Donald R. Stevenson, Dover, Ohio

[73] Assignee: SCM Corporation, New York, N.Y.

[21] Appl. No.: 623,447

[22] Filed: Oct. 17, 1975

[51] Int. Cl.$^2$ .................................... C08L 75/00
[52] U.S. Cl. .................. 260/859 R; 260/77.5 AN; 260/858
[58] Field of Search ............... 260/859 R, 77.5 AN

[56] References Cited

U.S. PATENT DOCUMENTS

| | | | |
|---|---|---|---|
| 3,051,687 | 8/1962 | Young | 260/77.5 |
| 3,169,945 | 2/1965 | Hostettler | 260/77.5 AN |
| 3,448,172 | 6/1969 | Damusis | 260/859 |
| 3,578,728 | 3/1971 | Ehrhart | 260/859 |
| 3,700,752 | 10/1972 | Hutchinson | 260/859 |
| 3,868,431 | 2/1975 | Hutchinson | 260/859 |
| 3,883,612 | 5/1975 | Pratt | 260/862 |
| 3,886,229 | 5/1975 | Hutchinson | 260/859 R |

*Primary Examiner*—Paul Lieberman
*Attorney, Agent, or Firm*—Thomas M. Schmitz

[57] ABSTRACT

This invention pertains to a one component low-shrink molding composition comprising a linear polyurethane thermoplastic in combination with preferably a dicyclopentadiene modified thermosetting polyester resin and a coreactive vinyl monomer. The low-shrink molding resin composition of this invention is a stabilized one-component uniform mixture wherein the linear polyurethane polymer is dispersed within the dicyclopentadiene polyester resin (polyester polymer + vinyl monomer) to provide a uniform dispersion. The linear polyurethane thermoplastic polymers are prepared from polycaprolactones containing polyether and polyesters reacted with diisocyanates. The linear polyurethanes contain carboxyl groups whereby the low-shrink molding resin composition can be thickened with alkyline earth and/or hydroxide thickeners for producing low-profile molded parts.

3 Claims, No Drawings

LOW-SHRINK THERMOSETTING POLYESTERS

BACKGROUND OF THE INVENTION

This application pertains to low-shrink molding resin systems based on thermosetting polyester polymers and relates to commonly assigned U.S. Pat. No. 3,883,612 issued on May 13, 1975, which is incorporated herein by reference.

Unsaturated thermosetting polyester polymers blended with vinyl monomers such as styrene are well-known molding resins that can be cured at room temperature or under heat and/or pressure to form a thermoset plastic molded part. Unsaturated polyester molding resins often are combined with inert fillers, glass fibers, glass flakes, clays and talcs, and the like for the purpose of obtaining improved impact strength, flexural strength, and rigidity in the molded part. Most conventional thermosetting polyester resins, however, characteristically shrink about 8 to 10% by volume and consequently distort during the molding process whereby the shrinkage causes unsatisfactory molded parts parts particularly for automotive parts. To offset the shrinkage characteristic of thermosetting polyester resin systems, low-shrink resin systems have been suggested based primarily on the inclusion within the thermosetting polyester resin system of a thermoplastic polymer such as an acrylic polymer wherein the thermoplastic acrylic is ordinarily incompatible with the liquid matrix thermosetting polyester resin and subsequently cures to a heterogeneous solid. A particularly desirable low-shrink thermosetting polyester resin composition is a stabilized one component system disclosed in U.S. Pat. No. 3,883,612 which provides a dicyclopentadiene modified thermosetting polyester resin containing a vinyl-acrylic thermoplastic uniformly dispersed therein whereby the low-shrink resin cures to lowprofile solid having the thermoplastic polymer uniformly distributed within the thermoset matrix phase.

It now has been found that an improved low-shrink thermosetting polyester resin system can be achieved by dispersing a linear, polyurethane within a dicyclopentadiene modified polyester resin to produce a stabilized, one component, uniform dispersion mixture that can be cured to form a low-profile molded part.

SUMMARY OF THE INVENTION

In accordance with this invention, the thermosetting lowshrink polyester molding resin composition comprises a linear polycaprolactone, a polypropylene glycol or a polyester oligomer thermoplastic polyurethane polymer mixed with a dicyclopentadiene modified unsaturated polyester polymer and a reactive vinyl monomer to provide a thermosetting, one component, stabilized uniform dispersion mixture. The linear polyurethane is preferably a polycaprolactone based polyurethane. The stabilized resin composition cures to form a low-profile solid having the thermoplastic polyurethane uniformly dispersed within the cured matrix of the thermoset polyester.

DETAILED DESCRIPTION OF THE INVENTION

The low-shrink thermosetting resin molding composition of this invention is based upon a linear, thermoplastic polyurethane polymer uniformly dispersed within a thermosetting dicyclopentadiene modified unsaturated polyester resin.

In accordance with this invention, the linear thermoplastic polyurethane polymer is preferably a polycaprolactone polymer, having a molecular weight between about 10,000 and 40,000 and preferably between about 15,000 and 35,000. The polycaprolactone polyurethane polymers can be produced by reacting a polycaprolactone prepolymer with diisocyanate as hereinafter described.

The polycaprolactone prepolymers are low molecular weight polymers having a molecular weight between about 600 and 2400 and produced by reacting caprolactone with lower diols or glycols such as ethylene glycol, diethylene glycol, propylene glycol, dipropylene glycol, 1,3 or 1,4 butylene glycol, and 1,4 cyclohexane diol as well as similar short chain diols having about 2 to 8 carbon atoms. The polycaprolactone prepolymers are essentially ester linkage diol polymers produced generally in accordance with the following:

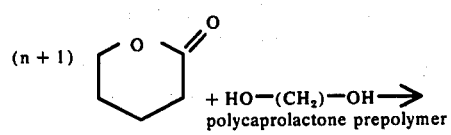

The resulting polycaprolactone prepolymer has a hydroxyl number of between about 50 and 215 wherein the excess molar equivalents of pendant hydroxyl groups can be reacted with a diisocyanate and preferably toluene diisocyanate (TDI) to produce a substantially linear thermoplastic polycaprolactone polyurethane polymer having a molecular weight of preferably between about 15,000 and 35,000. Molecular weight can be calculated as theoretical molecular weight from the equivalent molar ratios of the pendant hydroxyls on the polycaprolactone relative to the reactive isocyanate groups on the toluene diisocyanate. For example, 15 moles of polycaprolactone diol having a hydroxyl value of 135 and a molecular weight of about 823 can be reacted with 14 moles of toluene diisocyanate having a molecular weight of 174 to produce a polymer having a theoretical molecular weight of 14,781 by calculating as follows:

| | | |
|---|---|---|
| 15 × 823 | = | 12,345 |
| 14 × 174 | = | 2,436 |
| | | 14,781 |

The preferred linear polycaprolactone based polyurethane polymers of this invention provide surprising interaction with the thermosetting dicyclopentadiene modified polyester polymer and reactive vinyl monomer wherein the linear polyurethane polymer is based primarily on polycaprolactone and contains ester linkages. The ester linkages in the polycaprolactone-polyurethane thermoplastic polymer appear to be critical and quite distinguished from similar polyether linkages in comparable polypropylene glycols (polyethers) base polyurethanes which appear to cause incompatibility between the linear polyurethane thermoplastic and the matrix thermosetting DCP polyester polymer. Accordingly, the linear polyurethane polymers of this invention are predominately polycaprolactone polymers and preferably contain substantially all ester linkage polycaprolactone-polyurethane polymers for one pack stability.

The preferred linear polycaprolactone-polyurethane polymers of this invention can be prepared by reacting the polycaprolactone prepolymer diols with toluene diisocyanate in a styrene solvent at a temperature of about 55° C wherein a minor amount of a polystyrene inhibitor and a polyurethane catalyst are included in the reaction mixture. Polystyrene inhibitors for example can be para-benzoquinone and dibutyl tin dilaureate can be added as a catalyst for the diisocyanate reaction. The polyurethane polymer ordinarily contains excess molar hydroxyls relative to the toluene diisocyanate to produce hydroxyl terminated polyurethane. The hydroxyl groups on the polyurethanes can be further reacted with the addition of minor amounts of a dicarboxylic acid or anhydrides such as phthallic or succinic to produce a carboxyl terminated polyurethane polymer having reactive carboxyl groups suitable for thickening during the compounding of the low-shrink resin. The linear, polycaprolactone polyurethane contains by weight between about 0.2% to 0.8% carboxyl groups and generally has an acid number of between about 1 and 8.

The DCP-terminated polyester polymer preferably comprises a copolymer of glycol, unsaturated dibasic acid, and about 0.1–0.4 mols of dicyclopentadiene per mol of unsaturated dibasic acid. Although all of the raw materials can be charged into the reaction vessel and reacted together at temperatures of 290° F–310° F, it is preferred that the dicyclopentadiene be preferentially esterified with the unsaturated dicarboxylic acid to minimize etherification with hydroxyl groups. At temperatures of about 308° F, etherification of dicyclopentadiene with hydroxyl groups is a competing reaction to esterification of dicyclopentadiene with carboxyl groups. Hence, preferably only a portion of the glycol charge is reacted with a large molar excess of dibasic unsaturated acid to first form primarily an acid terminated glycol-dicarboxylic acid partial polymer. Thereafter, dicyclopentadiene is charged to the reactor and esterified to form a dicyclopentadiene-esterified polyester prepolymer.

The preferred DCP-terminated polyester prepolymer is prepared by first charging into the reactor 2 molar equivalents of dicarboxylic unsaturated acid per molar equivalent of glycol. The glycol and dicarboxylic acid mixture is then heated and reacted at temperatures of about 290°–310° F until substantially all of the glycol is esterified by the excess molar equivalent of unsaturated dicarboxylic acids. Completion of the glycol esterification can be measured as the acid number of the reactants become essentially constant, thus indicating no additional hydroxyl groups are available for esterification. Thereafter, dicyclopentadiene is added to the reactor and reacted with the glycoldibasic acid partial polymer at temperatures of less than 320° F. and preferably reaction temperatures of about 290°–310° F. After the dicyclopentadiene is completely charged to the reactor, the reactant mixture is maintained at about 308° F until the acid number of the reactants becomes essentially constant whereby the dicyclopentadiene is preferentially esterified with available terminal acid groups of the partial polymer. Thereafter, the remainder of the glycol charge may be added to the reactor whereupon the reaction is continued at temperatures of about 390° F to complete the formation of a DCP-terminated polyester polymer as more particularly set forth in U.S. Pat. No. 3,883,612.

The glycols that may be used in synthesizing the DCP-terminated polyester polymer of this invention are conventional polyols and may include, for example: ethylene glycol, propylene glycol, diethylene glycol, dipropylene glycol, butanediol, hexanediol, pentaerythritol, triethylene glycol, trimethylol propane glycerol, or mixtures thereof. Preferably, the glycols used in this invention are propylene glycol and/or dipropylene glycol as the major glycol component.

The unsaturated dibasic acid components in the DCP-polyester are $\alpha,\beta$-unsaturated dicarboxylic acids or anhydrides and include, for example, maleic, fumaric, mesaconic, itaconic, citraconic, and the like or mixtures thereof. The anhydrides are preferred in the preparation of the DCP-esterified prepolymer. Similarly, unsaturated dicarboxylic acid may be reacted at 308° F with the dicyclopentadiene and thereafter esterified with the full glycol requirement to produce a DCP-terminated polyester polymer. Although not preferred, lesser amounts of saturated dicarboyxlic acids or anhydrides may be introduced into the DCP-polyester polymer to replace a portion of the unsaturated dicarboxylic acids. Conventional saturated dicarboxylic acids include, for example, orthophthalic anhydride or acid terephthalic acid, isophthalic acid, adipic acid, sebacic acid, succinic acid, and the like acids or anhydrides. Similarly, minor amounts of multifunctional acid such as trimellitic anhydride may be incorporated into the DCP-polyester backbone. The term dibasic acid is intended to include dibasic acid anhydrides.

Ethylenically unsaturated monomers copolymerizable with unsaturated polyester polymers are untilized to disperse or dissolve the DCP-terminated polyester polymer of this invention and form a DCP-polyester resin mixture. Such ethylenically unsaturated monomers are well-known and include: styrene, methyl styrene, chlorostyrene, vinyl toluene, divinyl benzene, vinyl acetate, acrylic and methacrylic acid, lower alkyl esters of acrylic and methacrylic acid, diallyl phthalate and like unsaturated monomers or mixtures thereof. For reasons of efficiency and economy, the ethylenically unsaturated monomer most preferred in forming the low-profile molding resin of this invention is styrene. It should be noted that the DCP-terminated polyester polymer of this invention accommodates substantially increased amounts of unsaturated monomers in comparison to conventional low-profile polyester polymers and surprisingly improves the molded product and the molding process when increased amounts of monomer are used.

The foregoing stabilized resin emulsion desirably comprises a mixture by weight of at least about 25% of the dicyclopentadiene terminated polyester polymer, about 5–20% of acid functional linear thermoplastic polyurethane polymer, and about 40% to 58% of styrene or other ethylenically unsaturated vinyl monomer. The preferred resin mixture contains at least about 35% of said polyester, about 42%–52% monomer, and about 10% to 15% of an acid functional polymer having an acid number of less than about 12. The ratios of the polyester, monomer and polyurethane thermoplastic may be varied within the scope of this invention to provide a uniform and stabilized resin system as hereinbefore described.

The low-shrink molding resin composition of this invention is suitable for mixing with additives known as chemical thickeners which are physically mixed into the low-shrink molding resin system. The chemical thickeners generally include Group II metal oxides, hydroxides and alkoxides. The oxides and hydroxides of alkaline earths are preferred. For reasons of efficiency and economy, calcium oxide and magnesium oxide, or the respective hydroxides, are most often employed with low-shrink molding compositions.

Catalysts and promoters often are incorporated in small amounts into thermosetting polyester resins containing ethylenically unsaturated monomer for curing or cross-linking the unsaturated polyester with the vinyl monomer. Such catalysts, and promoters are well-known and may be similarly utilized in this invention for curing the DCP-polyester polymer and the vinyl monomer. Typical catalysts, for example, include organic peroxides and peracids such as tertiary butyl perbenzoate, tertiary butyl peroctoate, benzoyl peroxide and the like. Examples of conventional promoters include cobalt octoate, cobalt naphthenate, and amines such as diethylaniline. The amounts of catalysts and promoters may be varied with the molding process and similarly varied with the level and types of inhibitors utilized, in a manner well-known in the art.

Fibers and inorganic fillers normally added to polyester molding resin compositions can be likewise used in formulating the molding composition of this invention. Examples include: glass fibers, chopped fibers, chalk, kaolin, asbestos, kieselguhr, calcium carbonate, talc, ceramic spheres, and quartz.

The following examples are provided to illustrate the preferred embodiments of this invention and are not intended to restrict the scope thereof. All parts are parts by weight, all percentages are expressed as weight percentages, and all temperatures are in degrees Fahrenheit, unless otherwise expressly specified.

EXAMPLE 1

About 15.0 moles of a commercial polycaprolactone (Union Carbide NIAX PCP-0200) was reacted with 14.0 moles of toluene diisocyanate (Hylene TM) in sufficient styrene to produce a 50% polyurethane solid (N.V.M.) in a styrene solution. The polycaprolactone had a molecular weight of 823 and a hydroxyl number of 135. About 0.03% by weight p-hydroquinone based on the polymer solution was added to styrene prior to forming the polymer to prevent and inhibit homopolymerization of the styrene. About 0.2% of dibutyl tin-dilaurate based on polymer is added to the reactive components to catalyze the polymerization of the TDI with the polycaprolactone. The resulting 50% styrene solution of linear polyurethane polymer had a Gardner-Holt viscosity of about $Z_4$ and a theoretical molecular weight of about 14,780. Color was water-white.

EXAMPLE 2

A dicyclopentadiene-modified polyester polymer was synthesized from the following raw materials:
 9.9 gram moles of propylene glycol (752 grams)
 2.0 gram moles of dicyclopentadiene (264 grams)
 10.0 gram moles of maleic anhydride (980 grams).
Polymer synthesis was carried out in an ordinary reaction vessel suitable for batch processing of polyesters and including an agitator, heating means, condenser, and inert gas flow.
FIRST STEP:

Formation of an acid terminated partial copolymer of propylene glycol-maleic ester was made by charging 5.0 gram moles of propylene glycol and 10.0 moles of maleic anhydride together with 3% xylene (based on the charge) into the reaction vessel and by heating under inert gas to 300° F and holding at 300° F for about 30 minutes until the acid number of the batch became constant. The acid number became constant at about 412 whereupon the second step commenced.
SECOND STEP:

A prepolymer was prepared by adding the 2.0 moles of dicyclopentadiene to the propylene-maleic partial copolymer at a reaction temperature of 308° F. The 2.0 moles of dicyclopentadiene were mixed with 3% xylene and added to the reaction vessel at a steady and continuous rate for a time period of 30 minutes and the reaction then continued until the acid number of the batch leveled off at about 276.
THIRD STEP:

A dicyclopentadiene-terminated polyester was prepared by charging the remaining 4.9 moles of propylene glycol to the foregoing prepolymer in the reaction vessel, together with 0.3 grams of hydroquinone. The batch temperature was gradually increased to about 390° F and further processed until an acid number of 30 was reached. A test sample of 7 parts resin mixed with 3 parts styrene yielded a viscosity of 3,600 cps. at 77° F. Xylene and water of reaction were stripped from the batch.
FOURTH STEP:

The dicyclopentadiene polyester polymer was then cooled to 200° F 0.5 grams of hydroquinone were added to the polymer which was then diluted with styrene to yield a dicyclopentadiene polyester resin containing a ratio of 70 weight parts of dicyclopentadiene polyester polymers and 30 weight parts of styrene monomer. Thereafter, about 1 gram ionol was added and the resin was discharged to a holding tank.

EXAMPLE 3

The resin composition of Example 2 was mixed at room temperature with the polyurethane polymer of Example 1 together with styrene to produce a mixture on a weight basis as follows:
 28 parts of polymer (50% styrene) (Example 1)
 60 parts of DCP-polyester polymer (30% styrene) (Example 2)
 12 parts of styrene
 2 parts t-butyl perbenzoate.
The mixture was mildly agitated to form a uniform stabilized resin dispersion. The resulting resin had a viscosity of 1500 centipoises, a weight per gallon of 8.9.

EXAMPLE 4

A bulk molding compound was prepared by mixing together in a Baker-Perkins dough mixer the following materials (parts by weight):

| | |
|---|---|
| CaCO₃ | 53.0 |
| Zinc stearate | 1.5 |
| Molding resin composition of Example 3 | 27.0 |
| ¼" glass strand | 20.0 |
| Mg(OH)₂ | 0.5 |

Three-fourths of the indicated calcium carbonate and zinc stearate were first dry blended in the mixer. The t-butyl perbenzoate catalyst, remaining calcium carbonate and pigment were stirred into the liquid molding resin composition and that mixture slowly added to the material in the dough mixer while mixing continued. After thorough wetting of the calcium carbonate had been achieved, the magnesium hydroxide was added and mixing was continued for about two minutes. The chopped glass-fiber reinforcement was added and mixing was continued for about 2 minutes until the glass had been thoroughly wetted. The mixing period after addition of the glass was kept as short as possible, consistent with achieving wetting of the glass and uniform dispersion of the glass and thickener, so as not to cause excessive breaking of the glass into shorter strands which would contribute less reinforcement to the molded articles to be produced from the bulk molding compound. The bulk molding compound was finally discharged from the mixer and held overnight (before molding) to insure that the thickening process was substantially complete. A molded test piece was molded in the following shape: about nine inches square and ⅛ inch thick having on one of its surfaces: (1) a straight rib about ½ inch deep tapering from about 75/16 inches long and 9/16 inch wide at the base to about 73/16 inches long and ⅜ inch wide at its flat outer extremity, having rounded ends and with its longitudinal centerline about one inch from the edge of the nine-inch square; (2) an L-shaped ribe about ½ inch deep with branches about 7½ inches long and 1¼ inches wide having centerlines about one inch from the edges of the nine-inch square, the long branch being parallel to the straight rib (1) above and near the opposite edge of the square, the width tapering from about 5/16 inch at the base to inch at the base to about ¼ inch at its flat outer extremity and having rounded ends tapered at about the same angle as the straight rib (1) above; and three circular bosses centered at about 2 inch intervals along a line about 2½ inches from the edge of the square adjacent to the long branch of the L-shaped rib (2) above and being, respectively, (a) about ½ inch deep and tapering from about one inch in diameter at the base to about 15/16 inch at its flat extremity, (b) about ¼ inch deep and tapering from about one inch in diameter at the base to about 31/32 inch at its flat extremity, and (c) about ¼ inch deep and tapering from about ⅝ inch diameter at the base to about 9/16 inch at its flat extremity, wherein all tapers were approximately flat except for 3(c) in which the taper was more pronouned near the base and less pronouned near the extremity.

About 350 grams of the bulk molding compound from Example 5 was placed as a compact mass in the steel die which had been preheated to 295° F. on the cavity side and 285° F. on the plunger side, the die was quickly closed in a press, and held closed for two minutes. The press was then opened and the molded piece removed from the die. An excellent part was obtained. The molded part had negligible shrink was free of sink marks and had a smooth surface.

EXAMPLE 5

A linear polyurethane was produced in a manner similar to Example 1 by reacting the following components in a styrene solution.

8.0 moles of polycaprolactone (Union Carbide NIAX PCP-240) having a molecular weight of 1950, a hydroxyl number of 56.
7.0 moles of toluene diisocyanate (Hylene TM)
0.2% dibutyl tin-dilaurate (on polymer solids)
0.03% hydroquinone (on total solution)

The resulting polymer solution at 50% NVM in styrene was water white having a Gardner-holt viscosity of $Z_6$ and a theoretical molecular weight of about 16,700. Viscosity at 35% NVM was $Y^-$. The foregoing linear polyurethane was tested in the manner indicated in Example 4 and produced an excellent low-profile molded part.

EXAMPLE 6

The following linear polyurethanes were produced in a manner similar to Example 1 and tested in accordance with Example 4. The resin mixtures were stable, one-component low-shrink mixtures and produced good low-profile molded parts.

TABLE 1

|   | Polyurethane | Molecular Weight | Viscosity 35% NVM | Remarks |
|---|---|---|---|---|
| a) | 22 moles polycaprolactone (NIAX PCP-0210) | | | Good resin stability. Good low-profile molded parts. |
|   | 21 moles TDI (Hylene TM) | 21,760 | X | |
| b) | 11.0 moles of polycaprolactone (NIAX PCP-0240) | 23,000 | X | Good resin stability. Good low-profile molded parts. |
|   | 10.0 mole TDI (Hylene TM) | | | |
| c) | 19.0 moles polycaprolactone (NIAX PCP 0240) | | Z,+ | Fair resin stability. Good low-profile molded parts. |
|   | 18.0 moles TDI (Hylene TM) | 39,900 | | |
| d) | 19.0 moles polycaproplactone (NIAX PCP 0240) | | | Fair resin stability. Good low-profile molded parts. |
|   | 19.0 moles TDI (Hylene Tm) 1.0 moles dimethylol propionic acid | 40,300 | Z | |
| e) | 16.0 moles polycaprolactone (NIAX PCP 0240) | | | Fair resin stability. Good low-profile molded parts |
|   | 15.0 moles TDI (Hylene TM) | 33,630 | $Z_3+$ | |

EXAMPLE 7

A polyurethane produced from a polypropylene glycol was similarly synthesized in styrene from 30 moles polypropylene glycol (Union Carbide, NIAX PPG-1025) having a molecular weight of 995 and a hydroxyl No. of 111.0, reacted with 29 moles TDI (Hylene TM) to produce a linear polyether-type polyurethane having a theoretical molecular weight of 34,900 and a Gardner-Holt viscosity at 35% NVM in styrene of K+. The resin was incompatible when mixed with the DCP-polyester of Example 2 indicating visual turbidity when mixed whereupon complete two-phase separation occurred within six days.

Similar polyether based polyurethanes were synthesized and resin instability with the thermosetting DCP-polyester resin resulted. Upon mixing with polycaprolactone-polyurethane thermoplastic polymers of this invention, resin instability occurred unitl major amounts of polycaprolactone-polyurethane was used with only minor amounts of polyether based polyurethane. Accordingly, the preferred thermoplastic polyurethane comprises primarily polycaprolactone-polyurethane and preferably the polyurethane thermoplastic consists of a polycaprolactone-polyurethane polymer.

EXAMPLE 8

The following examples indicated that linear polyurethane that are primarily based on polycaprolactone diol to produce predominately ester linkage polycaprolactone-polyurethane although minor molar amounts of polyglycol can be etherified into the polycaprolactone polymer backbone.

a. 30 moles polycaprolactone diol molecular weight 551
10 moles polypropylene glycol (diol) molecular weight 437
39 moles TDI (Hylenes TM)

Resulting polycaprolactone-polyurethane polymer had a theoretical molecular weight of 27,716, a viscosity of $Z_3$ at 35% NVM in styrene. Upon mixing with a DCP-polyester the stability was fair and the low-shrink properties were good.

b. 20 moles polycaprolactone
20 moles polypropylene glycol
1 mole dimethyl propionic acid
40 moles TDI (Hylene TM)

The resulting polymer had a molecular weight of 26,850 and a viscosity of V at 35% NVM in styrene and produced a good low-shrink additive for thermosetting polyesters c. 20 moles polycaprolactone
20 moles polypropylene glycol
1 mole trimethylol propane
1 succinic anhydride
40 moles TDI (Hylene TM)

The resulting polymer had a molecular weight of 26,971 and viscosity of $Y^-$ at 35% NVM. The polymer provided a good low-shrink additive.

The foregoing are preferred embodiments of this invention but are not intended to be limited except by the appended claims.

I claim:

1. A stabilized, low-shrink molding resin composition for thickening with Group II metal oxides, hydroxides, or alkoxides, the resin composition being a stabilized resin emulsion mixture comprising by weight a mixture of at least 25% of a dicyclopentadiene terminated ethylenically unsaturated polyester polymer containing dicyclopentadiene esterified with carboxylic acid and said polymer containing between about 0.1 to 0.4 moles of dicyclopentadiene per 1 mole or dicarboxylic acid, about 5% to 20% of acid functional thermoplastic having an acid number of at least about 0.4, and about 40% to 58% of an ethylenically unsaturated monomer, the improvement comprising:

said thermoplastic being a polycaprolactone-polyurethane linear polymer having a molecular weight between about 10,000 and 40,000 and being predominantly a caprolactone esterified with excess equivalents of glycol having 2 to 6 carbon atoms to produce a polycaprolactone polymer having a hydroxyl value of between about 50 to 215, said polycaprolactone polymer being reacted with diisocyanate to form said polycaprolactone-polyurethane linear polymer.

2. The resin composition in claim 1 wherein the caprolactone is reacted with glycols selected from ethylene glycol, diethylene glycol, propylene glycol, dipropylene glycol, 1,3 butylene glycol, 1,4 butylene glycol, and 1,4 cyclohexane diol.

3. The resin composition in claim 1 wherein the diisocyanate is toluene diisocyanate.

* * * * *